United States Patent

[11] 3,599,954

| [72] | Inventor | Ming-chih Yew<br>Sterling Heights, Mich. |
|---|---|---|
| [21] | Appl. No. | 864,599 |
| [22] | Filed | Oct. 8, 1969 |
| [45] | Patented | Aug. 17, 1971 |
| [73] | Assignee | General Motors Corporation<br>Detroit, Mich. |

[54] COMPOUND VACUUM SPRING
7 Claims, 3 Drawing Figs.

[52] U.S. Cl. .................................................. 267/34,
267/65, 280/124
[51] Int. Cl. ....................................................... B60g 11/58
[50] Field of Search .......................................... 267/65 A,
65 C, 65 D, 34, 35, 31; 280/124 F

[56] References Cited
UNITED STATES PATENTS

| 3,524,657 | 8/1970 | Yew ............................. | 267/34 X |
| 3,385,589 | 5/1968 | Erdman ....................... | 267/34 |

*Primary Examiner*—Philip Goodman
*Attorneys*—W. E. Finken and D. L. Ellis

ABSTRACT: A vehicle suspension system in which a pair of vacuum energized auxiliary spring bellows are nested within the confines of the primary coil suspension spring between the sprung and unsprung masses of the vehicle, each such spring bellows providing a load simulating force on the coil spring acting additively with the other spring bellows to alter the static height of the sprung mass.

PATENTED AUG 17 1971　　　　　　　　　　　　3,599,954

INVENTOR
Ming-Chih Yew
BY
D. L. Ellis
ATTORNEY

COMPOUND VACUUM SPRING

This invention relates to composite spring assemblies and more particularly to composite spring assemblies employing pressure differential energized auxiliary springs operative to alter static height deflection of primary vehicle suspension springs.

It has been known to employ composite spring assemblies in vehicle suspensions wherein pressure differential energized auxiliary springs are nested generally coaxially within a primary coil suspension spring and operative under application of vacuum or optionally superatmospheric pressure to create pressure differential forces serving to selectively level or alter the static height of the sprung mass of the vehicle relative to the unsprung mass. The nested configuration is highly advantageous in conserving underbody space used for reception of engine exhaust system structure, shock damper struts, etc. However, the nested configuration imposes limitations on the size of the pressure area of the auxiliary spring which can be made subject to the created pressure differential, and thereby limits the levelling capacity of the composite spring unit. While this limitation is not unimportant when the pressure is to be created by a superatmospheric pressure source, it is exceedingly important when working with subatmospheric sources in which the available pressure differential relative to atmospheric pressure is of course very limited.

It is accordingly the primary object of this invention to provide a new and improved composite spring assembly wherein the pressure differential energized auxiliary spring is nested within the primary coil suspension spring for conservation of space, but is significantly less subject to the described limitation on levelling capacity.

A more specific object of this invention is to provide a composite spring wherein a pair of auxiliary pressure differential energized springs are arranged in nested relation within the primary coil suspension spring and each of which are operative to apply a pressure differential force derived from the available transverse area within the primary spring and acting additively with the other of the auxiliary springs to alter the static height deflection of the primary spring.

In accordance with the foregoing objects, a composite spring assembly is provided wherein a first auxiliary pressure differential energized air spring bellows is nested within the upper portion of the primary coil suspension spring in a manner to transmit forces realized from the application of subatmospheric pressure therein directly between the sprung and unsprung masses of the vehicle, while an additional auxiliary air spring bellows is nested within the lower portion of the coil spring coaxially with the first air spring bellows and operative on such lower portion of the spring to provide a pressure differential force acting additively with the force of the first air spring bellows to alter the total static height deflection of the coil spring.

While the immediate foregoing has reference to the application of the composite spring using vacuum or subatmospheric pressure, it is to be appreciated that like advantages accrue with nested composite spring configurations where the pressure differential is created by application of superatmospheric pressure.

The foregoing and other objects, features and advantages of the invention will be readily apparent from the following description and from the drawings wherein.

Figure 1:
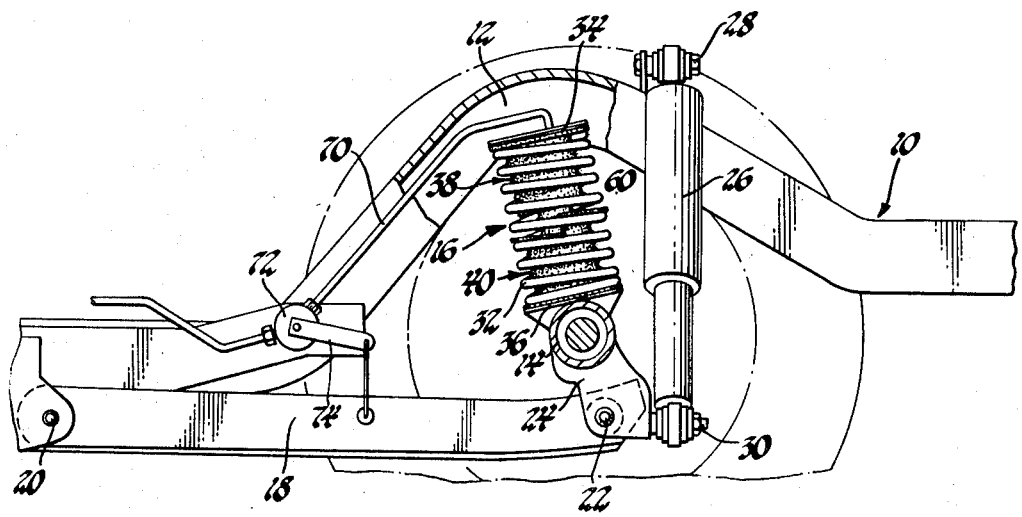
FIG. 1 is a fragmentary side elevational view of a vehicle suspension embodying the composite spring assembly of this invention.

Referring now particularly to FIG. 1 of the drawings, an automotive vehicle rear suspension arrangement is shown wherein numeral 10 generally designates one vehicle body frame side rail representing the sprung mass of the vehicle, the frame including a rear kickup portion 12. Such kickup portion accommodates reception between the body and rear axle housing 14 of the rear suspension of the sprung mass including the composite spring of this invention, designated generally as 16. A trailing suspension control arm 18 has pivotal connection at 20 on a bracket attached to the side rail 10 or cross member therefrom, while the rearward end of the trailing arm has pivotal connection at 22 with a bracket 24 suitably fixed to the axle housing 14. A shock damper or absorber strut 26 extends from pivotal mounting at 28 on side rail 10 and similar pivotal mounting at 30 on bracket 24 as is conventional.

The composite spring assembly 16 includes a primary coil suspension spring 32 arranged in compression between the frame side rail 10 and the rear axle housing 14, the latter representing the unsprung mass of the vehicle, by an upper seat 34 fixed to the side rail in well known manner and by a lower spring seat 36 fixed to the axle housing 14. Nested within coil spring 32 are a pair of auxiliary subatmospheric energized air spring bellows 38 and 40.

According to previous proposals for nested composite spring assemblies capable of altering the static height of the sprung mass and the deflection of the primary suspension spring thereunder by the application of engine produced subatmospheric pressure, the primary coil spring is selected of such strength as to define a "curb height"; i.e., the height at which the sprung mass rests absent its normal full load complement of passengers, fuel and cargo, which generally exhibits a tilt or higher elevation of the rear end of the body relative to the front. Such curb height distinguishes from "design height" wherein the sprung mass carries the normal load complement and at which the vehicle body is level to the ground. For conditions where the sprung mass rests intermediate these heights, the nested composite springs employ subatmospheric pressure to simulate a load on the sprung mass equivalent to that portion of the normal load complement absent from the sprung mass, thereby to maintain the vehicle level. Considering the limited range of pressure differential relative to atmosphere available from a subatmospheric pressure source, the added limitation on pressure area available when using the nested type of auxiliary air spring bellows or like unit may, depending upon the size of car and load complement thereof, militate against the use of vacuum altogether and require use of the generally more expensive superatmospheric source.

According to the principal feature of the invention the two auxiliary air spring bellows 38 and 40 are nested within the coil spring 32 for conservation of space in the area of frame kickup 12, but each derives from the limited transverse area enveloped within the coil spring a pressure differential force acting additively with the pressure differential force of the other auxiliary spring thereby to obtain significantly increased leveling capacity.

Figures 2, 3:
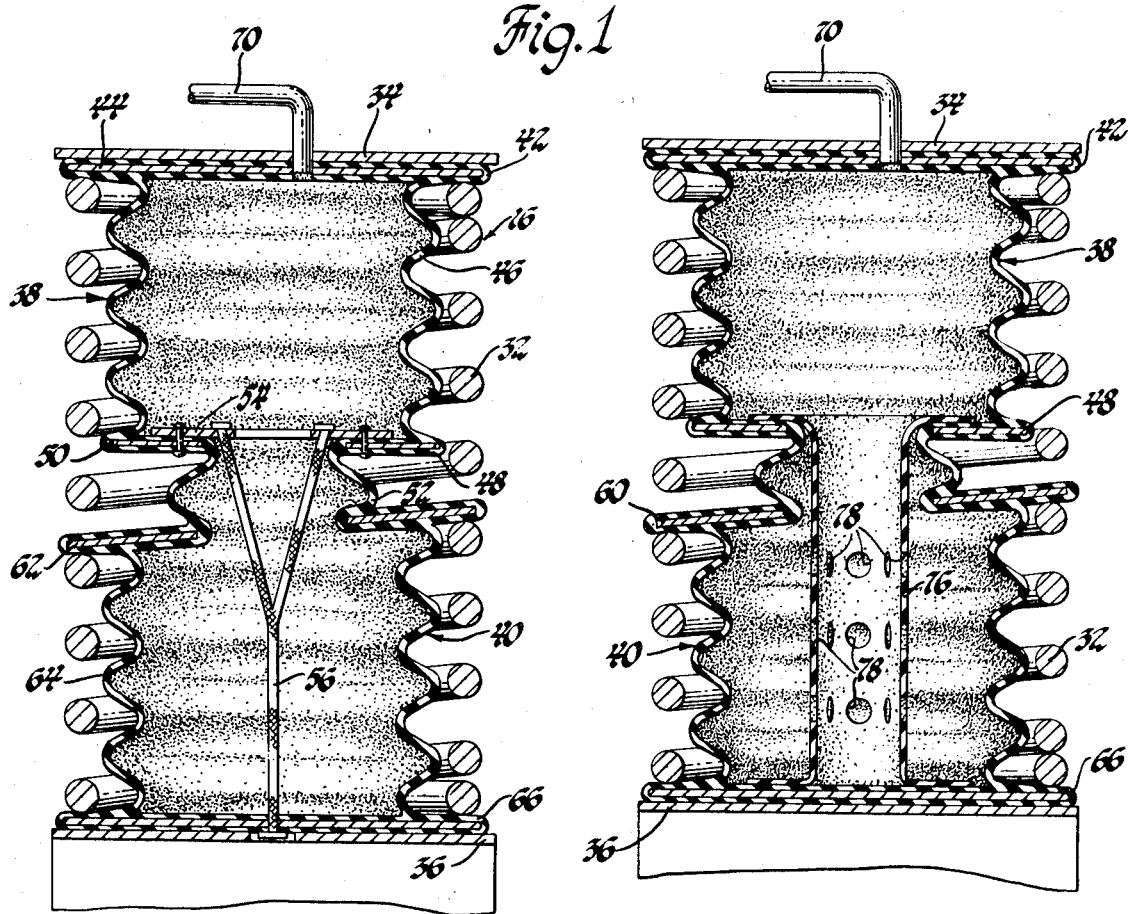
FIG. 2 is an enlarged sectional view of the composite spring of FIG. 1.
FIG. 3 is a sectional view similar to FIG. 2 showing a modified form of the composite spring.

As shown best in FIG. 2, air spring bellows 38 nested within the upper portion of coil spring 32 has its circular end portion 42 interposed between spring seat 34 and the upper end of the coil spring. The end portion 42 includes a generally circular reinforcing plate 44 bonded or otherwise suitably arranged within the enclosing rubber or like flexible material which forms the convoluted bellows portion 46. At its lower end, the bellows portion 46 merges with a similar lower end portion 48 including a circular reinforcing plate 50 having a central aperture over which the rubber material of the spring bellows is formed in a manner to define an opening to an integral convoluted axially flexible duct 52. Attached to lower end portion 48 by rivets or the like is a circular plate 54 having a central aperture, it in turn having mounted thereto the spaced ends of a wishbone shape tension cable 56. The other end of the cable is suitably fixed to the lower spring seat 36. As will be apparent, cable 56 is operative in tension to provide load transferring connection between the lower end portion 48 of air spring bellows 38 and the lower spring seat but is inoperative to carry compression forces therebetween. With the integral duct 52 being constructed sufficiently flexible to offer no substantial resistance, it is seen that the communication of subatmospheric pressure to the air spring bellows 38 will provide a pressure differential across the effective area of the atmosphere exposed lower end portion 48 and that the resulting pressure differential force transfers directly between the upper and lower spring seats 34 and 36 through cable 56.

The other end of the collapsible duct 52 merges integrally with the upper end portion 60 of the lower air spring bellows 40, such end portion again being constructed in laminated manner with an intermediate reinforcing plate 62. Such upper end portion again is constructed integrally with the bellows portion 64 of the air spring in turn having integral connection with the lower laminated reinforced end portion 66 thereof interposed between the lower end of the coil spring and the lower spring seat 36. As indicated best in FIG. 1, the upper end portion 60 is constructed in a convoluted or helical configuration substantially equal the pitch of the coil spring so that the upper end portion will directly bear substantially on one full 360° convolution of the coil spring. Accordingly, the lower air spring bellows 40 is operative in parallel relation with the other air spring bellows 38 through the portion of the coil spring intermediate the end portion 60 and the lower spring seat in that communication of subatmospheric pressure to the closed volume within the lower air spring bellows creates pressure differential across the effective area of the upper end portion 60, thereby resulting in a pressure differential force operative to provide a load simulating compression of that confined coil spring portion.

The two air spring bellows 38 and 40 are communicated to an engine source of vacuum or subatmospheric pressure, not shown, through a conduit 70, seen best in FIG. 1. Interposed in the conduit is a levelling valve 72 having a control lever 74 connected to suspension control arm 18. The control lever correlates the position of valve 72 relative to displacement between the sprung and unsprung masses so that vacuum is applied through conduit 70 to produce a simulated load equal to the difference between the actual load of the sprung mass and that which includes the normal load complement required to produce design height. The vacuum applied through conduit 40 is of course communicated directly to the volume of upper air spring bellows 38 and, through the integral duct 52, to the volume of the lower air spring bellows 40 as well. Thus, upper air spring bellows 38 imposes a load simulating force between the spring seats 34 and 36 operative to compress the coil spring, and additionally such vacuum further results in a force on the pressure area of the lower air spring bellows serving to compress the lower bounded portion of the coil spring between the upper end portion 60 and the lower spring seat 36 acting additively on such spring portion with the simulated load applied by the upper air spring bellows 38. Accordingly, while a space conserving composite spring is provided having the air spring bellows nested within the confines of the coil spring 32, the limited pressure area available through a transverse section enveloped by such spring is advantageously employed through use of two pressure areas, one in each of the two air spring bellows.

It is to be appreciated that, with both air spring bellows 38 and 40 being energized with subatmospheric pressure, these bellows add deflection resistance or rate to the rate of coil spring 32 operative during dynamic deflection of the vehicle suspension on the roadway. When the interior of the vacuum springs are caused increasing volume reduction during dynamic operation the pressure increase resulting therein provides a variable rate in the upper or spring bellow 38 applied through the tension cable 56 until the compression brings the pressure within the two air spring bellows to that of the atmosphere, at which point tension cable 56 is no longer operative for force transfer between the upper air spring bellows 38 and the unsprung mass. Accordingly, the compression or jounce stroke of the suspension does not see an undesirable rapid rate buildup. Lower air spring bellows 40, being substantially trapped within the convolutions of coil spring 32, does add its rate to the composite spring assembly through the jounce stroke. On extension or rebound, both lower air spring bellows 40 and the upper air spring bellows 38 through the tension cable 56 are operative through an increasing decompression made by volume expansion thereof to add their rate to the coil spring 32, thereby damping the rebound of the sprung mass.

FIG. 3 shows a modified form of the invention with like numerals referring to like parts, wherein instead of the tension cable 56, a tension operative tube 76 of reinforced rubber or like substantially high-tensile strength material interconnects the upper air spring bellows and the lower spring seat 36. The upper end of the tube may be formed integrally or bonded with the laminated lower end portion 48 while the lower end of the tube is likewise similarly fixed to the laminated lower end portion 66 of the lower air spring bellows 40. In this case, apertures 78 are provided in the tube to communicate the two air spring bellows for application of subatmospheric pressure simultaneously thereto.

While, in both embodiments, the two air spring bellows 38 and 40 are sized with relation to one another to have placement of the upper end portion 60 in abutting relation generally on a middle convolution of coil spring 32, the two air spring bellows may be sized differently than shown within the practical limits dictated by static height and dynamic deflection of the coil spring 32. The lower air spring bellows 40 may thus be operative in parallel with the upper air spring bellows over a greater portion of the coil spring by setting the lower end portion 48 on a somewhat higher spring convolution short of the seated convolution. It is further to be appreciated that the flexible bellows configuration of air spring might be substituted for by opposed cylinders or similar devices.

Having thus described the invention, what is claimed is:

1. In an automotive vehicle including sprung and unsprung masses, a composite spring assembly comprising, a coil primary suspension spring mounted between said sprung and unsprung masses, a first differential pressure energized auxiliary spring disposed within the confines of said coil spring having a pressure area limited substantially to the area enveloped by said coil spring transversely thereof, an additional differential pressure energized auxiliary spring also disposed within the confines of said coil spring having a pressure area limited substantially to the area enveloped by said coil spring transversely thereof, and means connecting said auxiliary springs to act additively between the sprung and unsprung masses of the vehicle to modify the static height deflection of said primary coil suspension spring.

2. In an automotive vehicle having sprung and unsprung masses and a source of subatmospheric pressure, a composite spring assembly comprising a coil primary suspension spring arranged in compression between the sprung and unsprung masses of the vehicle, a first subatmospheric pressure energized auxiliary spring disposed within the confines of said coil spring and having a pressure end portion thereof exposed to atmospheric pressure, an additional subatmospheric pressure energized auxiliary spring disposed within the confines of said coil spring generally coaxially with said first auxiliary spring and having a pressure end portion exposed to atmospheric pressure, each of said auxiliary springs having a closed volume bounded by said pressure end portions thereof and connected with said auxiliary springs to act additively between the sprung and unsprung masses of the vehicle under application of subatmospheric pressure to said closed volumes and oppose said coil spring to vary the static height deflection thereof.

3. The composite spring of claim 2 wherein each of said auxiliary springs comprise axially flexible bellows members.

4. The composite spring of claim 3 wherein said flexible bellows members are pressure interconnected by axially flexible duct means.

5. In an automotive vehicle having sprung and unsprung masses and a source of subatmospheric pressure, a composite spring assembly comprising a coil primary suspension spring arranged in compression between the sprung and unsprung masses of the vehicle, a first subatmospheric pressure energized auxiliary spring bellows mounted at one end to said sprung mass and disposed within the confines of an upper portion of said coil spring and having an opposite pressure end portion exposed to atmospheric pressure, an additional subatmospheric pressure energized auxiliary spring bellows mounted at one end to said unsprung mass and disposed within the confines of a lower portion of said coil spring generally coaxially with said first spring bellows and having an opposite pressure end portion exposed to atmospheric pressure, each of said spring bellows having a closed volume bounded by said pressure end portions thereof and connected with said subatmospheric pressure source, tension means connecting said pressure end portion of said first spring bellows with said unsprung mass, and means connecting the pressure end portion of said additional spring bellows to said coil spring such that said additional spring bellows is operative to act on said coil spring lower portion in parallel with said first spring bellows.

6. The composite spring of claim 5 wherein axially flexible duct means pressure interconnect said spring bellows and wherein said tension means comprise a flexible cable within said duct means.

7. The composite spring of claim 5 wherein said tension means comprises a tension bearing tube having ports through which pressure communication between said spring bellows is had.